UNITED STATES PATENT OFFICE 2,649,480

RECOVERY OF OXYTETRACYCLINE

Peter P. Regna, Woodcliff, N. J., and Rudolph A. Carboni, Jackson Heights, and Albert E. Timreck, New York, N. Y., assignors to Chas. Pfizer & Co., Inc., a corporation of Delaware No Drawing. Application April 3, 1950, Serial No. 153,760

6 Claims. (Cl. 260—559)

This invention relates to the preparation of purified oxytetracycline from dilute aqueous solutions of the antibiotic, such as a fermentation broth. More particularly, it concerns the preparation of aryl azo sulfonic acid salts of oxytetracycline and the regeneration therefrom of the purified antibiotic.

Oxytetracycline is a valuable antibiotic produced by the growth of S. rimosus on a suitable culture medium. This antibiotic and various methods for its recovery and purification are described in the U. S. Patent 2,516,080, issued July 18, 1950, to Ben A. Sobin, Alexander C. Finlay and Jasper H. Kane.

It has been discovered that the antibiotic oxytetracycline may advantageously be precipitated from dilute aqueous solutions by the addition of a variety of aryl azo sulfonic acid dyes. These dilute aqueous solutions include crude materials, such as filtered fermentation broths containing from 300 to 1000 mcg./ml. of the antibiotic and also containing the usual organic and inorganic impurities. The pH of the solution from which the resultant dye salt is precipitated must be strongly acid, ranging from about pH 1.5 to about 3.5. In this respect the process of the invention differs fundamentally from the dye salt precipitation of other antibiotics, such as streptomycin and streptothricin. The most effective pH for any particular dye varies somewhat within the foregoing range. Among the aryl azo sulfonic acid dyes that may be used in the process of the invention are the following:

| Dye | Colour Index # |
|---|---|
| Polar Yellow 5G | 642 |
| Metanil Yellow | 138 |
| Wool Blue-Black 6B | 304 |
| Orange II | 151 |
| Eriochrome Violet | 169 |
| Diamond Green 3GA | 302 |
| Ponceau 2G | 28 |
| Acid Green G | 666 |
| Direct Fast Blue R | 567 |

In general, the above mentioned dyes will precipitate a substantial proportion of the oxytetracycline present in a dilute aqueous solution, such as a filtered fermentation broth. The optimum pH for maximum precipitation with each dye varies somewhat within the range given above. For most dyes this optimum lies between 2 and 3. Usually about 3 to 10 grams of the dye are required for each liter of the fermentation broth. Of the dyes listed above, Polar Yellow and Metanil Yellow are preferred, since they give more complete precipitation of the desired product. The addition of ionizable salts, such as sodium sulfate, sodium chloride, potassium chloride, and the like, will appreciably increase the amount of precipitation.

The oxytetracycline content of the precipitated dye salt may be regenerated in a variety of ways. Preferably a metathesis reaction is employed to break up the dye salt and to separate the dye component from the antibiotic component. The separation is achieved by a double decomposition producing a compound containing one component that is insoluble in the medium employed, while the other component is dissolved in said medium. The preferred regeneration procedure will now be described in detail.

After the dye salt has been precipitated from the acidified, filtered broth, the precipitate may be filtered out and washed with acidified water. The dye cake is then dried, finely ground and suspended in a solvent, such as acetone. The resultant thin slurry is then treated with a concentrated solution of triethylamine sulfate, which has been adjusted to about pH 2.0. After the suspension thus formed has been stirred for a short period, it is filtered, and the solid portion is thoroughly washed with the solvent used. Acetone is the preferred solvent for removing the regenerated dye, although other solvents, such as methyl ethyl ketone and methyl isobutyl ketone and mixtures of these solvents may be used. The cake of oxytetracycline sulfate so produced is dried until substantially free of organic solvent. This may be done at an elevated temperature, such as about 50° C.

The dried oxytetracycline sulfate cake is triturated one or more times with a minimum quantity of water and filtered. The cake is washed with small amounts of water, until the wash water shows little or no color, and the clear aqueous solution (filtrates plus wash waters) of oxytetracycline sulfate is treated with a dilute solution of sodium hydroxide, until a pH of approximately 6.0 is reached. The precipitated, free oxytetracycline is collected by filtration or by centrifugation and washed with water. The oxytetracycline obtained by such a procedure has a bioassay of between 400 and 600 mcg./mg.

The following examples of the recovery of purified oxytetracycline through precipitation of its dye salts are given for purposes of illustration. The invention is not limited to the details given therein, but includes all such modifications as come within the scope of the appended claims.

Example I

Three liters of an oxytetracycline fermentation broth (780 mcg./ml.) are acidified to pH 2.8 to 3.0 by the addition of sulfuric acid, about 5% by weight of Super-cel are added, and the mixture is stirred for 30 minutes. The broth is then filtered through a pre-coat of Super-cel. The clarified filtrate is adjusted to pH 2.4 to 2.5 with dilute sulfuric acid and then treated with 2% by weight of Super-cel and a 5% aqueous solution of Polar Yellow. A total of 6 grams of Polar Yellow is used per liter of filtered broth, in order to complete the precipitation. The resultant suspension is stirred for 30 minutes, and the dye salt is filtered out over Super-cel. The dye cake is washed with about $\frac{1}{10}$ volume of water based on the original broth volume. The water is adjusted to pH 2.5 with dilute sulfuric acid before use. The washed cake is dried in vacuo at 50° C.

The dried dye cake (100 g., 18,000 mcg./g.) is finely ground and suspended in acetone using about 300 ml. of the solvent. The rapidly stirred suspension is treated with 10 ml. of syrupy triethylamine sulfate. This triethylamine sulfate solution is prepared by acidifying an aqueous solution of the amine to pH 2.0 with dilute sulfuric acid, and then concentrating the resulting solution to a heavy syrup in vacuo, in order to keep water to a minimum. After stirring the suspension for 30 minutes, it is filtered and the cake of oxytetracycline sulfate so obtained is washed thoroughly with acetone. It is then dried substantially free of acetone at 50° C.

The dried oxytetracycline sulfate cake is triturated at least twice in the smallest volume of water that can conveniently be used. The aqueous solution is filtered through Super-cel, and the remaining cake is washed with small portions of water until the wash water is practically colorless (If the combined aqueous solutions are evaporated to dryness at this stage, the product weighs 11 grams and assays 150 mcg./mg.). By adjusting the combined aqueous filtrates and wash waters with a solution of 10% sodium hydroxide to a pH of 5.0–7.0, the free oxytetracycline is precipitated. It is filtered, washed thoroughly with water and dried. The resultant material has a bioassay of 400 mcg./mg. and is suitable for further purification, such as a preparation of the crystalline antibiotic.

Example II

To a 500 ml. sample of filtered oxytetracycline broth (950 mcg./ml.) at a pH of 2.85 are added with stirring 3 g. of Metanil Yellow (sodium salt) in 50 ml. of hot water. After adjusting the pH to 2.25 with sulfuric acid, Super-cel (10 g.) is added, and the mixture is then filtered. All but 100 mcg./ml. of the antibiotic is removed in the dye cake. The cake is washed with 100 ml. of water adjusted to pH 2 with sulfuric acid and then dried.

The dried dye cake is stirred with 50 ml. of methanol, which dissolves the oxytetracycline dye salt. The first extract is filtered and is found to assay 3000 mcg./ml. More of the antibiotic may be recovered by further extraction of the dye cake with methanol. Purified oxytetracycline-dye salt may be recovered by concentrating the methanolic solution under vacuum.

Example III

A clarified oxytetracycline fermentation broth assaying 1000 mcg./ml. (30 ml.) was adjusted to pH 2 with sulfuric acid, and 6 ml. of a 5% aqueous solution of Diamond Green (sodium salt) were added. The precipitate of oxytetracycline-dye salt was centrifuged down, and the supernatant liquid was found to contain only 335 mcg./ml. of antibiotic. The oxytetracycline content of the precipitate was regenerated by dissolving it in 20 ml. of dilute sodium hydroxide and adjusting the pH to 9. The solution contained 900 mcg./ml. of oxytetracycline.

Example IV

The above example was repeated using a 5% solution of Pontacyl Blue Black (sodium salt). In this case the supernatant solution assayed 290 mcg./ml., while the regenerated oxytetracycline solution assayed 1100 mcg./ml.

There is claimed:

1. In the recovery of oxytetracycline from a dilute aqueous solution thereof derived from a microorganism fermentation broth, the step of adding to such a solution maintained at a pH of from about 1.5 to about 3.5 an aryl azo sulfonic acid dye.

2. A process as claimed in claim 1 wherein the precipitated oxytetracycline-dye salt is separated from the solution and then broken up to regenerate its oxytetracycline content by metathesis reaction.

3. In the recovery of purified oxytetracycline from a filtered fermentation broth containing same, the steps of adjusting the pH of said broth to between about 1.5 and about 3.5, adding an aryl azo sulfonic acid dye to the solution, and separating the precipitate of oxytetracycline-dye salt thus formed.

4. A process as claimed in claim 3 wherein the separated oxytetracycline-dye salt is broken up by a metathesis reaction in a liquid organic medium.

5. In the recovery of oxytetracycline, the steps of forming a salt of oxytetracycline and an aryl azo sulfonic acid dye at a pH between about 1.5 and about 3.5, suspending said oxytetracycline-dye salt in an organic liquid in which it is substantially insoluble, adding to the suspension an amine salt of a strong inorganic acid, and separating the precipitated inorganic acid of oxytetracycline from the dissolved amine salt of the dye formed in the reaction mixture.

6. A process as claimed in claim 1 wherein the pH of the aqueous solution is maintained between 2 and 3.

PETER P. REGNA.
RUDOLPH A. CARBONI.
ALBERT E. TIMRECK.

References Cited in the file of this patent

UNITED STATES PATENTS

| Number | Name | Date |
|---|---|---|
| 2,462,175 | Folkers | Feb. 22, 1949 |
| 2,516,080 | Sobin | July 18, 1950 |
| 2,555,760 | Regna et al. | June 5, 1951 |

OTHER REFERENCES

Peck: In J. A. C. S., May 1946, pp. 772–776.